United States Patent
Castelain et al.

(10) Patent No.: US 7,315,529 B2
(45) Date of Patent: Jan. 1, 2008

(54) PRE-DISTORTION METHOD FOR TELECOMMUNICATION SYSTEM AND TRANSMITTER FOR MOBILE TERMINAL OF MC-CDMA TELECOMMUNICATION SYSTEM

(75) Inventors: Damien Castelain, Rennes (FR); David Mottier, Rennes (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1113 days.

(21) Appl. No.: 10/335,870

(22) Filed: Jan. 3, 2003

(65) Prior Publication Data

US 2003/0133403 A1 Jul. 17, 2003

(30) Foreign Application Priority Data

Jan. 11, 2002 (EP) .................. 02290079

(51) Int. Cl.
*H04B 7/216* (2006.01)
(52) U.S. Cl. ................... 370/335; 370/342
(58) Field of Classification Search ......... 370/332, 370/334–335, 343; 375/296
See application file for complete search history.

(56) References Cited

U.S. PATENT DOCUMENTS

| | | | | | |
|---|---|---|---|---|---|
| 5,872,814 | A | * | 2/1999 | McMeekin ............ | 375/296 |
| 6,118,335 | A | * | 9/2000 | Nielsen et al. ........ | 330/2 |
| 6,298,096 | B1 | * | 10/2001 | Burgin ............... | 375/296 |
| 6,498,529 | B1 | * | 12/2002 | Kim et al. ........... | 330/2 |
| 6,577,192 | B2 | * | 6/2003 | Maniwa et al. ....... | 330/149 |
| 6,794,936 | B2 | * | 9/2004 | Hsu et al. ........... | 330/149 |
| 6,817,412 | B2 | * | 11/2004 | Haase ............... | 166/250.01 |
| 6,952,561 | B1 | * | 10/2005 | Kumar et al. ......... | 455/63.1 |
| 7,027,523 | B2 | * | 4/2006 | Jalali et al. .......... | 375/296 |
| 7,035,345 | B2 | * | 4/2006 | Jeckeln et al. ........ | 375/296 |
| 7,072,381 | B2 | * | 7/2006 | Atarashi et al. ....... | 375/144 |
| 7,158,582 | B2 | * | 1/2007 | Gamm et al. ......... | 375/296 |
| 7,200,367 | B1 | * | 4/2007 | Wright et al. ......... | 455/91 |
| 2001/0016014 | A1 | * | 8/2001 | Nam ................. | 375/285 |
| 2002/0000316 | A1 | * | 1/2002 | Haase ............... | 166/244.1 |
| 2002/0044014 | A1 | * | 4/2002 | Wright et al. ......... | 330/2 |
| 2002/0054585 | A1 | * | 5/2002 | Hanada et al. ........ | 370/342 |
| 2002/0097784 | A1 | * | 7/2002 | Brunel .............. | 375/147 |
| 2002/0181549 | A1 | * | 12/2002 | Linnartz et al. ....... | 375/142 |

(Continued)

OTHER PUBLICATIONS

Li, J et al. (Digital predistortion linearizer for multicarrier spread spectrum; Radio and Wireless Conference, 1999. RAWCON 99. 1999 IEEE Aug. 1-4, 1999 pp. 227-230).*

(Continued)

*Primary Examiner*—Hassan Kizou
*Assistant Examiner*—Salman Ahmed
(74) *Attorney, Agent, or Firm*—Oblon, Spivak, McClelland, Maier & Neustadt, P.C.

(57) ABSTRACT

The invention concerns a pre-distortion method for a telecommunication system comprising a base station and at least one user. Each symbol of said user is spread with a coding sequence over a plurality of carriers to produce a plurality of corresponding frequency components of a signal ($S_i(t)$) to be transmitted over an uplink transmission channel to said base station. Each frequency component is weighted by a weighting coefficient ($\omega_i(l)$), said weighting coefficient being determined from the downlink channel response coefficient ($h_i(l)$) at the corresponding frequency and from a value of the noise variance ($\sigma^2$) affecting said carriers.

8 Claims, 4 Drawing Sheets

U.S. PATENT DOCUMENTS

| | | | |
|---|---|---|---|
| 2002/0191710 A1* | 12/2002 | Jeckeln et al. | 375/296 |
| 2003/0031270 A1* | 2/2003 | Giardina et al. | 375/296 |
| 2004/0190598 A1* | 9/2004 | Seki et al. | 375/141 |
| 2006/0039331 A1* | 2/2006 | Abeta et al. | 370/335 |
| 2006/0239233 A1* | 10/2006 | Hanada et al. | 370/335 |

OTHER PUBLICATIONS

Sundstrom, L et al. (Quantization analysis and design of a digital predistortion linearizer for RF power amplifiers;Vehicular Technology, IEEE Transactions on vol. 45, Issue 4, Nov. 1996 pp. 707-719).*

Mandyam, G.D. (Phase predistortion for a cdma2000 system; Signals, Systems and Computers, 2000. Conference Record of the Thirty-Fourth Asilomar Conference on vol. 2, Oct. 29-Nov. 1, 2000 pp. 1308-1312 vol. 2).*

Jaehyun et al. (A data predistortion technique for the compensation of nonlinear distortion in MC-CDMA systemsSignal Processing Advances in Wireless Communications, 1999. SPAWC '99. 1999 2nd IEEE Workshop on May 9-12, 1999 pp. 174-177).*

Nobilet et al. (Performance of predistortion techniques for uplink MC-CDMA systems with TDD and FDD modesWireless Personal Multimedia Communications, 2002. The 5th International Symposium on vol. 2, Oct. 27-30, 2002 pp. 655-662 vol. 2).*

Cho et al.(RF predistortion of power amplifiers using 2/sup nd/ harmonic based technique for optimization of intermodulation products; Vehicular Technology Conference, 2002. Proceedings. VTC 2002-Fall. 2002 IEEE 56thvol. 1, Sep. 24-28, 2002 pp. 621-624 vol. 1).*

U.S. Appl. No. 10/335,898, filed Jan. 3, 2003, Castelain et al.

U.S. Appl. No. 10/335,870, filed Jan. 3, 2003, Castelain et al.

* cited by examiner

PRE-DISTORTION METHOD FOR TELECOMMUNICATION SYSTEM AND TRANSMITTER FOR MOBILE TERMINAL OF MC-CDMA TELECOMMUNICATION SYSTEM

BACKGROUND OF THE INVENTION

1. Field of the Invention

The present invention relates to a method for uplink pre-distortion for a Multi-Carrier Code Division Multiple Access (MC-CDMA) telecommunication system.

2. Description of the Related Art

MC-CDMA has been receiving widespread interest for wireless broadband multimedia applications. Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike DS-CDMA (Direct Spread Code Division Multiple Access), in which the signal of each user is multiplied in the time domain in order to spread its frequency spectrum, the signature here multiplies the signal in the frequency domain, each element of the signature multiplying the signal of a different sub-carrier.

In general, MC-CDMA combines the advantageous features of CDMA and OFDM, i.e. high spectral efficiency, multiple access capabilities, robustness in presence of frequency selective channels, high flexibility, narrow-band interference rejection, simple one-tap equalisation, etc.

More specifically, FIG. 1 illustrates the structure of an MC-CDMA transmitter for a given user i. We consider here the uplink, i.e. we suppose that the transmitter is located in the mobile terminal (denoted MT) of a user i. Let $d_i(n)$ be the symbol to be transmitted from user i at time nT to the base station, where $d_i(n)$ belongs to the modulation alphabet. The symbol $d_i(n)$ is first multiplied at 110 by the a spreading sequence (and a scrambling sequence which is here omitted for the sake of clarity) denoted $c_i(t)$. The spreading sequence consists of N "chips", each "chip" being of duration $T_c$, the total duration of the spreading sequence corresponding to a symbol period T. Without loss of generality, we assume otherwise specified in the following that a single spreading sequence is allocated to the user. In general, a user may be allocated one or a plurality of orthogonal spreading sequences (multi-code allocation) according to the data rate required. In order to mitigate intra-cell interference, the spreading allocated to different users are preferably chosen orthogonal.

The result of the multiplication of the symbol $d_i(n)$, hereinafter simply denoted $d_i$ by the elements of the spreading sequence gives N symbols multiplexed in 120 over a subset of N frequencies of an OFDM multiplex. In general the number N of frequencies of said subset is a sub-multiple of the number L of frequencies of the OFDM multiplex. We assume in the following that L=N and denote $c_i(l)=c_i(lT_c)$, l=0, . . . ,L−1 the values of the spreading sequence elements for user i. The block of symbols multiplexed in 120 is then subjected to an inverse fast Fourier transformation (IFFT) in the module 130. In order to prevent intersymbol interference, a guard interval of length typically greater than the duration of the impulse response of the transmission channel, is added to the MC-CDMA symbol. This is achieved in practice by adding a prefix (denoted Δ) identical to the end of the said symbol. After being serialised in the parallel to serial converter 140, the MC-CDMA symbols are converted into an analogue signal which is then filtered and RF frequency up-converted (not shown) before being amplified in amplifier 150 and transmitted over the uplink transmission channel. The MC-CDMA method can essentially be regarded as a spreading in the spectral domain (before IFFT) followed by an OFDM modulation.

The signal $S_i(t)$ at time t which is supplied to the amplifier before being transmitted over the reverse link transmission channel can therefore be written, if we omit the prefix:

$$S_i(t) = d_i \sum_{l=0}^{L-1} c_i(l) \exp(j \cdot 2\pi f_l t) \text{ for } nT \le t < (n+1)T \quad (1)$$

where $f_l=(l-L/2)/T$, l=0, . . . ,L−1 are the frequencies of the OFDM multiplex. More precisely, it should be understood that the transmitted signal is in fact $Re(S_i(t)\exp(j2\pi F_0 t))$ where Re(.) stands for the real part and $F_0$ is the RF carrier frequency. In other words, $S_i(t)$ is the complex envelope of the transmitted signal.

An MC-CDMA receiver for a given user i has been illustrated schematically in FIG. 2. Since we consider the uplink, the receiver is located at the base station.

After baseband demodulation, the signal is sampled at the "chip" frequency and the samples belonging to the guard interval are eliminated (elimination not shown). The signal obtained can be written:

$$R(t) = \sum_{i=0}^{K-1} \sum_{l=0}^{L-1} h_i(l) \cdot c_i(l) \cdot d_i \cdot \exp(j \cdot 2\pi f_l t) + b(t) \text{ for } nT \le t < (n+1)T \quad (2)$$

where where t takes successive sampling time values, K is the number of users and $h_i(l)$ represents the response of the channel of the user i to the frequency of the subcarrier l of the MC-CDMA symbol transmitted at time n.T and where b(t) is the received noise.

The samples obtained by sampling the demodulated signal at the "chip" frequency are serial to parallel converted in 210 before undergoing an FFT in the module 220. The samples in the frequency domain, output from 220, are despread by the spreading sequence of user i. To do this, the samples of the frequency domain are multiplied by the coefficients $c_i^*(l)$ (here in the multipliers $230_0, \ldots, 230_{L-1}$) and then added (in adder 240). The summation result is detected in 250 for supplying an estimated symbol $\hat{d}_i$. Although not represented, the detection may comprise an error correction decoding like a Viterbi or a turbo-decoding which are known as such.

Furthermore, in MC-CDMA as in DS-CDMA, equalisation can be performed at the receiving side in order to compensate for the dispersive effects of the transmission channel. In MC-CDMA, the samples in the frequency domain are respectively multiplied with equalising coefficients $q_i(l)$, l=0, . . . ,L−1 (here in $230_0, \ldots, 230_{L-1}$). However, in MC-CDMA in contrast to DS-CDMA, there is no simple equalisation method for an uplink channel because the estimation of an uplink channel appears very complex.

Indeed in MC-CDMA, this estimation must be performed before despreading, i.e. at the chip level, when the signal from the different users are still combined. In contrast, in DS-CDMA, this estimation is usually performed after despreading, i.e. at the symbol level, and therefore separately for each user.

In order to overcome the problem of channel estimation, it has been proposed to implement a pre-distortion at the transmitter side (i.e. in the mobile terminal, denoted MT), so that a simple demodulator could be used at the receiver side without needing to estimate the channel. The basic idea underlying pre-distortion is to exploit the reciprocity of the transmission channels (in TDD), that is the downlink channel estimation performed for the downlink demodulation is used as an estimation of the uplink channel. This implies both TDD-operation (same frequency band used for the uplink and downlink), and relatively low MT mobility, i.e. low Doppler frequency.

An MC-CDMA TDD-system with (downlink) pre-distortion has been described e.g. in the article of D. G. Jeong et al. entitled "Effects of channel estimation error in MC-CDMA/TDD systems" published in VTC 2000-Spring Tokyo, IEEE $51^{st}$, Vol. 3, pages 1773-1777. Pre-distortion is simply effected by multiplying each frequency component of the MC-CDMA symbol to be transmitted by the inverse of the channel response coefficient at said frequency, i.e. $h_i^{-1}(l)$. However, contrary to what is put forward in the above mentioned paper such downlink pre-distortion is not possible since the base station (denoted BS) cannot send one common pre-distorted multi-user signal which would have been optimised for the different propagation downlink channels from the base station to the mobile terminals ($h_i^{-1}(l)$ depends on i). This problem does not exist for the uplink transmission channels and one could think to apply this pre-distortion technique for the uplink. However, multiplying the frequency components by the coefficients $h_i^{-1}(l)$ may lead to a very high transmitted power if the uplink transmission channel exhibits deep fades (i.e. $h_i(l)$ may be close to zero for some subcarriers l). This high transmitted power decreases in turn the battery autonomy and may significantly increase the interference towards adjacent cells.

SUMMARY OF THE INVENTION

An object of the present invention is to design a simple pre-distortion technique for an uplink channel in an MC-CDMA system which does not present the drawbacks set out above. To this end, the invention is defined by the pre-distortion method claimed in claim 1. Advantageous embodiments of the invention are set out in the dependent claims.

BRIEF DESCRIPTION OF THE DRAWINGS

The characteristics of the invention will emerge from a reading of the following description given in relation to the accompanying figures, amongst which.

DESCRIPTION OF THE PREFERRED EMBODIMENTS

Figure 1:
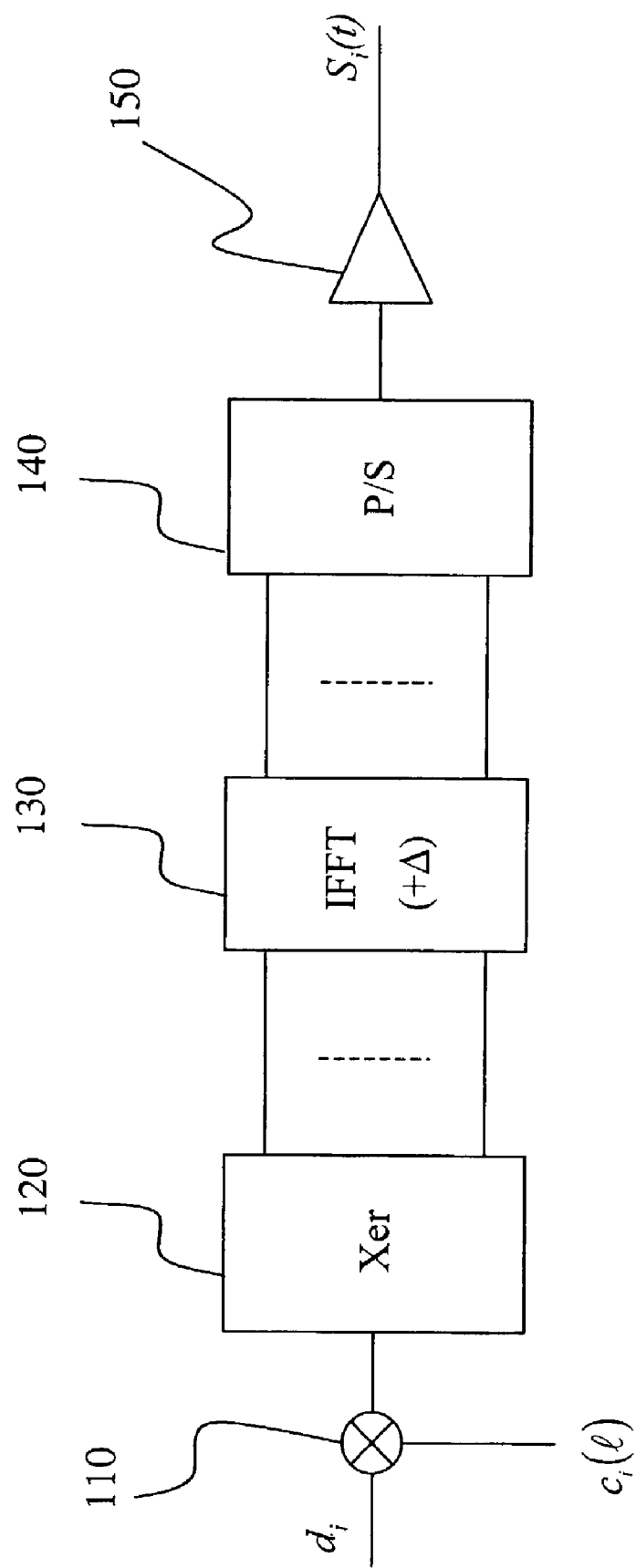
FIG. 1 depicts schematically the structure of an MC-CDMA transmitter known from the state of the art.

The basic idea underlying the invention stems from the analogy between the pre-distortion and the demodulation issues. In both cases, the channel selectivity destroys the orthogonality of the spreading sequences and orthogonality must be restored without unduly increasing the noise level (in the demodulation case), or without unduly increasing the transmitting power (in the pre-distortion case).

We refer back to the context of an MC-CDMA TDD telecommunication system and more specifically to a base station receiving complex symbols from a plurality of active users i=0, . . . ,K−1. Let us denote, for user i, $d_i$ the (complex scalar) transmitted symbol, $c_i$ the vector of components $c_i(l)$, $h_i$ the channel response vector of components $h_i(l)$, $w_i$ a pre-distortion vector of pre-distortion coefficients $w_i(l)$ and $\omega_i$ the corresponding vector of weighting coefficients $\omega_i(l) = w_i^*(l)$. In general, $c_i$, $h_i$, $w_i$ and $\omega_i$ are vectors of size N, where N is the spreading sequence length. As mentioned above, it is assumed that N=L, i.e. that the code sequence length is equal to the number of carriers and that one active user uses only one code sequence. However, the results set out below can be extended to the case where the number of carriers is greater than the spreading length (typically a multiple thereof) and/or to multi-code transmission.

After FFT, the received signal can be expressed as (see equation 2):

$$y = \sum_{j=0}^{K-1} d_j(\omega_j \circ h_j \circ c_j) + \eta = \sum_{j=0}^{K-1} d_j(w_j^* \circ h_j \circ c_j) + \eta \quad (3)$$

where $\eta$ is a vector of AWGN components of variance $\sigma^2$ and where $\circ$ expresses the vector multiplication element by element, that is $(x \circ y)_k = x_k \cdot y_k$.

The determination of the uplink channel responses being very difficult to achieve, the receiver of the base station simply demodulates the received signal by despreading it with each code sequence. The estimation of the symbol transmitted by the $i^h$ user can be expressed as:

$$\hat{d}_i = \mu c_i^H y = \mu \sum_{j=0}^{K-1} d_j c_i^H \cdot (w_j^* \circ h_j \circ c_j) + \mu c_i^H \eta \quad (4)$$

where $\mu$ is a normalisation coefficient which for example represents the gain of the automatic gain control (AGC). As the code sequences are assumed to be normalised, $\eta_i = c_i^H \eta$ has a variance equal to $\sigma^2$. The expression (4) can be simplified by introducing a set of vectors $v_{ij}$ where:

$$v_{ij} = c_i^* \circ h_j \circ c_j \quad (5)$$

Since the code sequences are assumed normalised and of constant amplitude, it can be noted that $$v_{ii} = \frac{1}{N} h_i.$$

Therefore the estimate $\hat{d}_i$ can then be rewritten as:

$$\hat{d}_i = \mu \sum_j d_j (w_j^H \cdot v_{ij}) + \mu \eta_i \qquad (6)$$

The power used by the mobile terminal i for transmitting the symbol $d_i$ can be expressed as:

$$P_i = |w_i|^2 = w_i^H \cdot w_i \qquad (7)$$

The interference term, denoted MAI($\rightarrow$i) and due to the users $j \neq i$, is equal to:

$$MAI(\rightarrow i) = \mu \sum_{\substack{j=0 \\ j \neq i}}^{K-1} d_j (w_j^H \cdot v_{ij}) \qquad (8)$$

whereas the useful term is equal to:

$$\tilde{d}_i = \mu d_i w_i^H v_{ii} = \frac{\mu}{N} d_i w_i^H h_i \qquad (9)$$

Assuming that the data $d_i$ are normalised, the interference power for user i can be derived from (8):

$$\Gamma(\rightarrow i) = \mu^2 \sum_{\substack{j=0 \\ j \neq i}}^{K-1} w_j^H v_{ij} v_{ij}^H w_j \qquad (10)$$

and noting that the variance of the noise affecting the estimate $\hat{d}_i$ is equal to $\mu^2 \sigma^2$, the signal to noise plus interference ratio for user i, denoted $SNIR_i$ can be expressed as:

$$SINR_i = \frac{\mu^2}{N^2} \frac{|w_i^H h_i|^2}{\Gamma(\rightarrow i) + \mu^2 \sigma^2} \qquad (11)$$

The purpose of the invention is to maximise $SNIR_i$ under the constraint of a fixed value for the transmitted power $P_i$. However, since the interference power $\Gamma(\rightarrow i)$ term depends on the vectors $h_j$, $j \neq i$ of the transmission channel response coefficients as well as on the pre-distortion vectors $w_j$, $j \neq i$ of the other users, the $SNIR_i$ cannot be maximised independently. We face therefore an optimisation problem involving all the channel responses of the users which appears very complex. On top of the complexity aspect, a general solution to the optimisation problem, if it were to exist, would necessarily imply that the pre-distortion vector $w_i$ for a given user i would be dependent on the channel response vectors of the other users $j \neq i$. Hence, in order to apply a pre-distortion a mobile terminal would have to know the channel responses for the other users, which is highly unrealistic.

According to the invention, the optimisation problem is elegantly solved by assuming that all the mobile terminals within a cell adopt the same pre-distortion procedure and that the channel response vectors $h_i$ are statistically identical. In such instance, the average interference power $\overline{\Gamma}(\rightarrow i)$ which affects the uplink channel of user i is equal to the total average interference power $\overline{\Gamma}(i\rightarrow)$ generated by the mobile terminal i and affecting the uplink channels of the other users.

$$\overline{\Gamma}(\rightarrow i) = \overline{\Gamma}(i \rightarrow) \text{ with } \overline{\Gamma}(i \rightarrow) = \mu^2 \sum_{\substack{j=0 \\ j \neq i}}^{K-1} w_i^H v_{ji} v_{ji}^H w_i \qquad (12)$$

and where the average values are estimated over the channel response coefficients $h_i(l)$.

Having regard to (12), it is proposed to introduce a pseudo signal to noise plus interference ratio, denoted m-SINR$_i$ for user i:

$$m-SINR_i = \frac{\mu^2}{N^2} \frac{|w_i^H h_i|^2}{\overline{\Gamma}(i \rightarrow) + \mu^2 \sigma^2} \qquad (13)$$

an to find the vector $w_i$ maximising m-SINR$_i$ for a fixed transmitted power $P_i = |w_i|^2$. Without loss of generality, it will be supposed in the following that $P_i = N$ (unit power per carrier). The interference power $\overline{\Gamma}(i\rightarrow)$ generated by user i can be reformulated as:

$$\overline{\Gamma}(i \rightarrow) = \mu^2 w_i^H \left( \sum_{\substack{j=0 \\ j \neq i}}^{K-1} v_{ji} v_{ji}^H \right) w_i = \mu^2 w_i^H \Phi_i w_i \qquad (14)$$

where the Hermitian matrix $$\Phi_i = \sum_{\substack{j=0 \\ j \neq i}}^{K-1} v_{ji} v_{ji}^H$$

represents the quadratic form associated with the generated interference power of user i. We want to find (see expression (11)):

$$\operatorname{argmax} \frac{|w_i^H h_i|^2}{w_i^H \Phi_i w_i + w_i^H w_i \frac{\sigma^2}{N}} = \operatorname{argmax} \frac{|w_i^H h_i|^2}{w_i^H \left( \Phi_i + \frac{\sigma^2}{N} I \right) w_i} \qquad (15)$$

such that $|w_i|^2 = N$.

It should be noted that expression (15) is unchanged when $w_i$ is multiplied by a constant, i.e. for all $\tilde{w}_i = \beta w_i$, whatever the scalar $\beta$. It is possible to look for the optimal $\tilde{w}_i$ that verifies $\tilde{w}_i^H h_i = 1$, and then to normalise the result by the factor $$\frac{\sqrt{N}}{\|\tilde{w}_i\|}$$

to obtain $w_i$. The optimum pre-distortion vector $\tilde{w}_i$ must therefore satisfy:

$$\operatorname{argmin}(\tilde{w}_i^H \Psi_i \tilde{w}_i) \text{ with } \Psi_i = \Phi_i + \frac{\sigma^2}{N} I \text{ and } \tilde{w}_i^H h_i = 1 \quad (16)$$

For solving this problem we introduce the Lagrange function:

$$L = \tilde{w}_i^H \Psi_i \tilde{w}_i - \lambda(\tilde{w}_i^H h_i - 1) = 0 \quad (17)$$

where $\lambda$ is a Lagrange multiplier. By calculating the gradients according to the vectors $\tilde{w}_i^*$ (the same result can be obtained by calculating the gradients according to the vectors $\tilde{w}_i$):

$$\nabla_{\tilde{w}_i^*} L = \Psi_i \tilde{w}_i - \lambda h_i = 0 \quad (18)$$

Finally, we can conclude that the optimal vector $\tilde{w}_i$ is given by:

$$\tilde{w}_i = \lambda \left( \Phi_i + \frac{\sigma^2}{N} I \right)^{-1} h_i \quad (19)$$

and therefore the optimal vector $w_i$ is given by:

$$w_i = \alpha \left( \Phi_i + \frac{\sigma^2}{N} I \right)^{-1} h_i \quad (20)$$

with $\alpha$ chosen so that $|w_i|^2 = N$. For a desired transmitted power, the pre-distortion vector for the mobile terminal of user i is proportional to $$\left( \Phi_i + \frac{\sigma^2}{N} I \right)^{-1} h_i,$$

expression which depends (through $\Phi_i$) on the spreading codes allocated to the other users but not on the channel responses of the other uplink channels. Indeed, the matrix $\Phi_i$ for user i can be expressed as a function of the code sequences $c_j$ (for all the users j) and channel response $h_i$ as follows:

$$\Phi_i = \sum_{j \neq i} v_{ij} v_{ij}^H = \sum_{j \neq i} (c_j^* \circ h_i \circ c_i)(c_j^* \circ h_i \circ c_i)^H \quad (21)$$

$$\Phi_i = \sum_{j \neq i} \operatorname{Diag}(h_i) \cdot \operatorname{Diag}(c_i) \cdot (c_j^* c_j^T) \cdot \operatorname{Diag}(c_i^*) \cdot \operatorname{Diag}(h_i^*) \quad (22)$$

where $\operatorname{Diag}(u)$ is the $N \times N$ diagonal matrix having the components of vector u as diagonal elements and $.^T$ denotes the transpose operation.

$$\Phi_i = \operatorname{Diag}(h_i) \cdot \operatorname{Diag}(c_i) \cdot \sum_{j \neq i} (c_j^* c_j^T) \cdot \operatorname{Diag}(c_i^*) \cdot \operatorname{Diag}(h_i^*) \quad (23)$$

and therefore:

$$\Phi_i = \operatorname{Diag}(h_i) \cdot \operatorname{Diag}(c_i) \cdot C_i^* C_i^T \cdot \operatorname{Diag}(c_i^*) \cdot \operatorname{Diag}(h_i^*) \quad (24)$$

where $C_i$ is the $N \times (K-1)$ matrix consisting of the spreading sequences except the spreading sequence of user i.

As it can be seen from expression (24), the calculation of $\Phi_i$ merely entails a multiplication by diagonal matrices which requires few simple operations, and the calculation of the matrix $C_i^* C_i^T$ for which fast algorithms, e.g. Fast Fourier Transform (FFT) or Walsh Hadamard Transform (WHT) do exist. The latter matrix needs only to be recalculated when the number of users or the code allocation changes, for example every frame. The matrix $\Phi_i$ and hence the vector $w_i$ does not depend on the vectors of channel coefficients $h_j$, $j \neq i$. It is reminded that the coefficients $h_i(l)$ of the uplink channel are supposed identical to those of the downlink channel.

The calculation of the matrix $\Phi_i$ can be simplified by operating on the amplitudes of the channel coefficients. More precisely, if $h_i(l) = \rho_i(l) e^{j\theta_i(l)}$ where $\rho_i(l)$ and $\theta_i(l)$ are respectively the amplitude and the argument of the channel response coefficient $h_i(l)$, and we denote $\rho_i$ and $e^{j\theta_i}$ the vectors of components $\rho_i(l)$ and $e^{j\theta_i(l)}$ respectively, we have:

$$\Phi_i = \operatorname{Diag}(e^{j\theta_i}) \Phi_i' \operatorname{Diag}(e^{-j\theta_i}) \quad (25)$$

where we have denoted:

$$\Phi_i' = \operatorname{Diag}(\rho_i) \cdot \operatorname{Diag}(c_i) \cdot C_i^* C_i^T \cdot \operatorname{Diag}(c_i^*) \cdot \operatorname{Diag}(\rho_i) \quad (26)$$

From equation (20) we obtain:

$$w_i = \alpha \left( \operatorname{Diag}(e^{j\theta_i}) \cdot \Phi_i' \cdot \operatorname{Diag}(e^{-j\theta_i}) + \frac{\sigma^2}{N} I \right)^{-1} h_i$$

$$w_i = \alpha \left( \operatorname{Diag}(e^{j\theta_i}) \left( \Phi_i' + \frac{\sigma^2}{N} I \right) \cdot \operatorname{Diag}(e^{-j\theta_i}) \right)^{-1} h_i$$

$$w_i = \alpha \operatorname{Diag}(e^{j\theta_i}) \cdot \left( \Phi_i' + \frac{\sigma^2}{N} I \right)^{-1} \cdot \operatorname{Diag}(e^{-j\theta_i}) h_i$$

$$w_i = \alpha \operatorname{Diag}(e^{j\theta_i}) \left( \Phi_i' + \frac{\sigma^2}{N} I \right)^{-1} \rho_i = \operatorname{Diag}(e^{j\theta_i}) w_i'$$

Hence, the vector of weighting coefficients can be written:

$$\omega_i = \operatorname{Diag}(e^{-j\theta_i}) \omega_i' \quad (27)$$

where $$\omega_i' = \alpha \cdot \left( \Phi_i' + \frac{\sigma^2}{N} I \right)^{-1} \rho_i \quad (28)$$

It is therefore possible to calculate first the matrix $\Phi_i'$ and to apply then the phase factors $e^{-j\theta_i(l)}$ to the real components $\omega_i'(l)$ of $\omega_i'$ as obtained in (28).

In general, the diagonal elements $$\gamma_{kk} = \sum_{\substack{j=0 \\ j \neq i}}^{K-1} C_{kj} C_{kj}^* = (K-1)/N$$

of the matrix $C_i^* C_i^T$ are expected to be larger than the off-diagonal elements $$\gamma_{kk'} = \sum_{\substack{j=0 \\ j \neq i}}^{K-1} C_{kj}^* C_{kj}'$$

since the terms $C_{kj}^* C_{k'j}$ tend to cancel out each other when $k \neq k'$ (uncorrelated spreading sequences). This is particularly true when the ratio K/N is large.

The matrix $\Phi_i$ can therefore be approximated by a diagonal matrix:

$$\Phi_i = \text{Diag}\left(\frac{K-1}{N}|h_i|^2|c_i|^2\right) = \frac{K-1}{N^2}\text{Diag}(|h_i|^2) \quad (29)$$

Hence, the pre-distortion coefficients $w_i(l)$ can be written, from (20) and (29):

$$w_i(l) = \alpha \frac{h_i(l)}{\frac{K-1}{N^2}|h_i(l)|^2 + \frac{\sigma^2}{N}} = \alpha' \frac{h_i(l)}{\frac{K-1}{N}|h_i(l)|^2 + \sigma^2} \quad (30)$$

where $\alpha' = N.\alpha$. Hence the weighting coefficients can be expressed as:

$$\omega_i(l) = \alpha' \frac{h_i^*(l)}{\frac{K-1}{N}|h_i(l)|^2 + \sigma^2} \quad (31)$$

It can be shown that the weighting coefficients obtained from (31) ensures an optimal pre-distortion per carrier (in the sense of a maximum m-SINR$_i$) when the channel response coefficients are uncorrelated, e.g. for a Rayleigh channel. A pre-distortion per carrier is defined here as a pre-distortion where each pre-distortion coefficient $w_i(l)$ is constrained to depend only on the channel response coefficient at the same frequency $h_i(l)$.

In addition, it can be shown that, if the channel response coefficients $h_i(l)$, $l=0,\ldots,L-1$ are correlated, the MAI level is reduced and the following expression for the weighting coefficients is advantageously used:

$$\omega_i(l) = \alpha' \frac{h_i^*(l)}{\beta \frac{K-1}{N}|h_i(l)|^2 + \sigma^2} \quad (32)$$

where $\beta$ is a weighting factor, $0 \leq \beta \leq 1$, which reflects the correlation of the channel response coefficients $h_i(l)$, $l=0,\ldots,L-1$ and departs from $\beta=1$ when the channel response coefficients are correlated.

The value of the noise variance $\sigma^2$ is taken here as the inverse of the SINR (Signal to Interference plus Noise Ratio) for the demodulated signal. The value of the noise variance $\sigma^2$ in (31) or (32) can be estimated by the base station and transmitted to the mobile terminal. Alternatively, a value of the noise variance $\sigma^2$ can be retrieved from a look-up table of typical values stored e.g. in a memory of the mobile terminal. In general, the table is indexed by the parameters of the communication as the targeted BER level, the type of modulation, the type of channel coding used.

Figure 3:
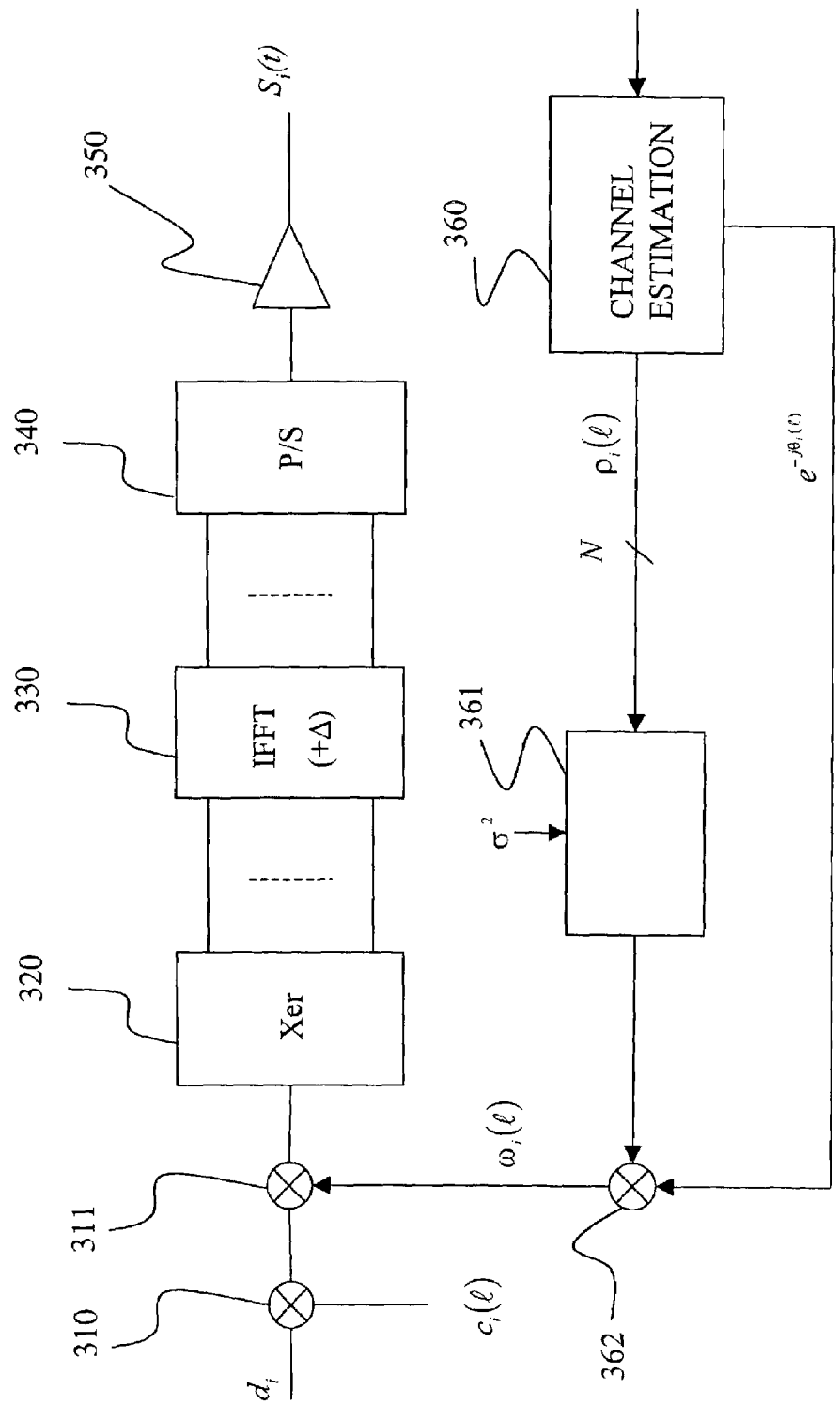
FIG. 3 depicts schematically the structure of an MC-CDMA transmitter according to the invention.

For illustrative purpose, FIG. 3 depicts schematically the structure of an MC-CDMA transmitter in a mobile terminal, implementing the pre-distortion method according to an embodiment of the invention. As in the prior art, the transmitter comprises a first multiplier 310 for multiplying the symbol to be transmitted by the code sequence of user i, a multiplexer 320 for multiplexing the results over the OFDM multiplex, a module 330 performing an inverse Fourier transform (with prefix insertion), a parallel/serial converter 340 and an amplifier 350. In contrast with the prior art however, the transmitter further comprises a second multiplier 311 for multiplying the frequency components $d_i c_i(l)$ with the weighting coefficients $\omega_i(l)$ respectively. The channel response coefficients $h_i(l)$ are obtained in the estimating means 360 e.g. from a received pilot symbol. The calculating means 361 may directly derive the weighting coefficients $\omega_i(l)$ from said channel response coefficients according to expression (31) or (32). Alternatively, as illustrated, the calculation in 361 can be performed on the amplitude values $\rho_i(l)$ that is $$\omega_i'(l) = \alpha' \frac{\rho_i(l)}{\beta \frac{K-1}{N}|\rho_i(l)|^2 + \sigma^2}$$

and the phase factors $e^{-j\Theta_i(l)}$ can be applied to the coefficients $\omega_i'(l)$ at the output of the calculating means with a further multiplier 362.

Figure 2:
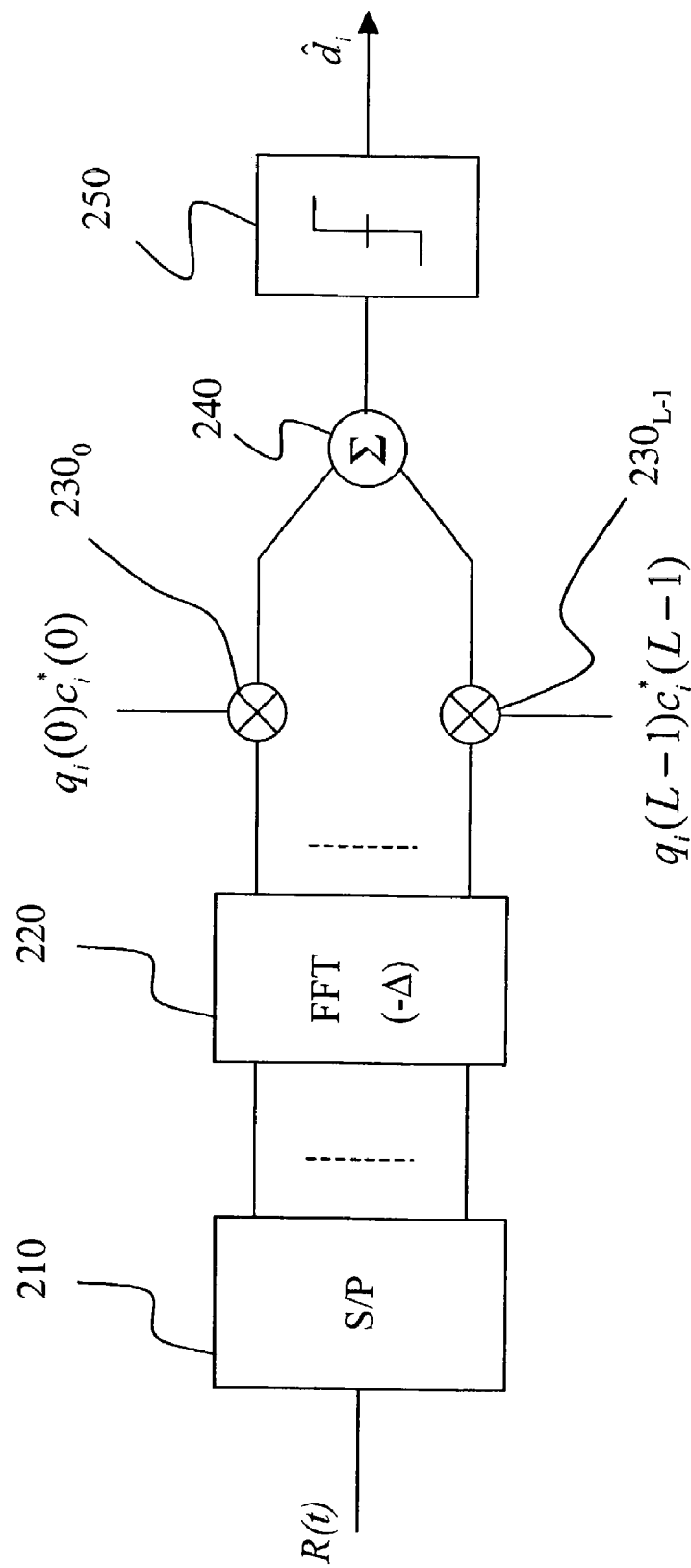
FIG. 2 depicts schematically the structure of an MC-CDMA receiver known from the state of the art.
Figure 4:
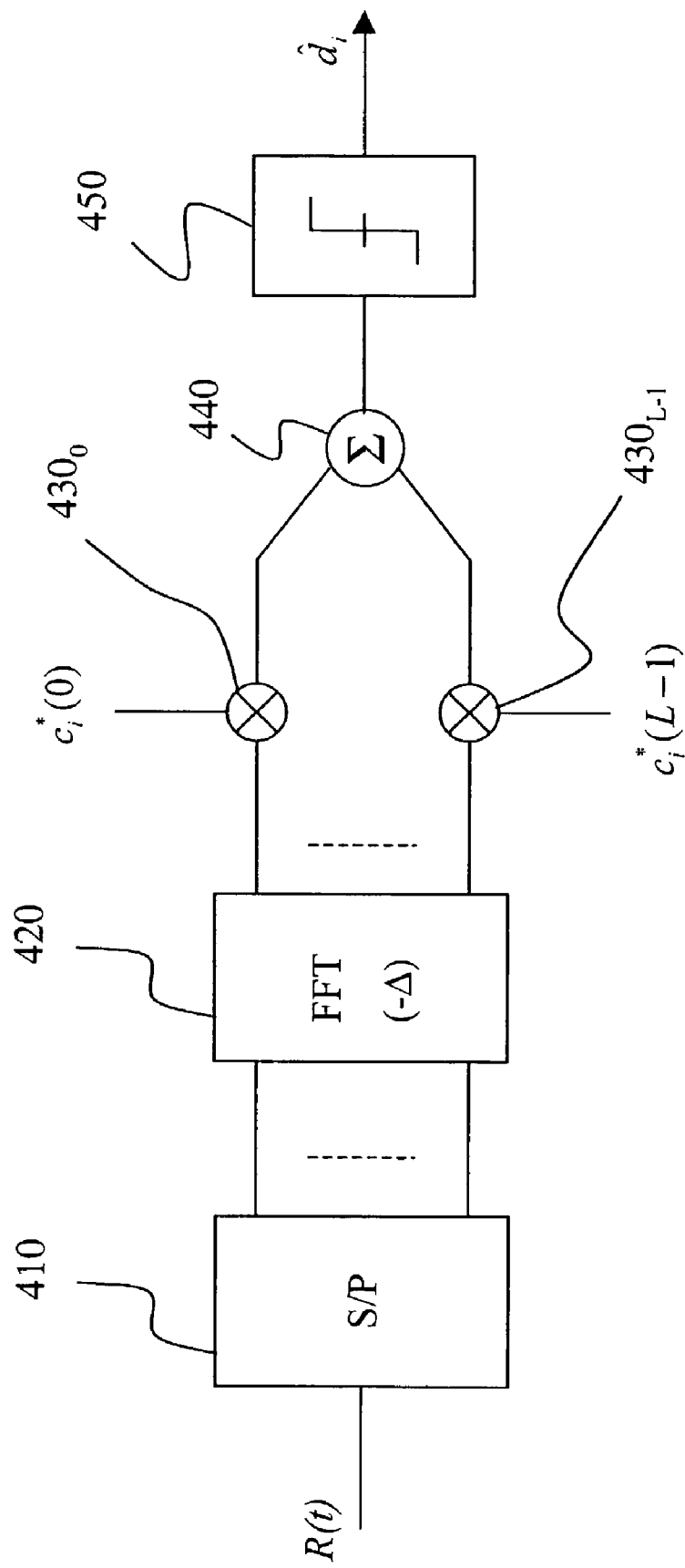
FIG. 4 depicts schematically the structure of an MC-CDMA receiver to be used with the MC-CDMA transmitter according to the invention.

FIG. 4 illustrates the structure of a MC-CDMA receiver in the base station adapted to receive a signal transmitted by a MC-CDMA transmitter according to the invention. As in the prior art of FIG. 2, the present receiver comprises a serial to parallel converter 410, an FFT module 420 (with prefix removal), multipliers $430_0$ to $430_{L-1}$ for multiplying the samples in the frequency domain by the conjugates $c_i^*(l)$ of the elements of the spreading sequence, an adder 440 and a detector 450 for supplying the estimated symbols. As in the prior art, an error control decoding can be provided, like a Viterbi decoding or a turbo-decoding. In contrast to the prior art, however, no equalisation is needed since pre-distortion has been performed at the transmitter side.

Although the MC-CDMA transmitter illustrated in FIG. 3 has been described in terms of functional modules e.g. computing or estimating means, it goes without saying that all or part of this device can be implemented by means of a single processor either dedicated for performing all the functions depicted or in the form of a plurality of processors either dedicated or programmed for each performing one or some of said functions.

What is claimed is:

1. A method of pre-distorting a signal ($S_i(t)$) to be transmitted over an uplink transmission channel to a base station by a mobile terminal (i), each symbol ($d_i$) transmitted by said mobile terminal being spread with a coding sequence ($c_i(l)$) over a plurality of carriers (l) to produce a plurality of corresponding frequency components ($d_ic_i(l)$) of said signal ($S_i(t)$), comprising:

weighting each frequency component ($d_ic_i(l)$) by a weighting coefficient ($\omega_i(l)$) corresponding to a channel response coefficient ($h_i(l)$) of a corresponding downlink transmission channel at a corresponding frequency ($f_l$) and to a value of a noise variance ($\sigma^2$) affecting said plurality of carriers, the weighting coefficient $\omega_i(l)$ being $$\omega_i(l) = \alpha' \frac{h_i^*(l)}{\beta \frac{K-1}{N} |h_i(l)|^2 + \sigma^2}$$

where, K is a number of active mobile terminals served by said base station, N is a length of said coding sequence, $\alpha'$ is a normalisation coefficient, $\beta$ is a real weighting coefficient, and * denotes a conjugate operation.

2. The method of claim 1, further comprising:
retrieving said value of noise variance ($\sigma^2$) from a look-up table.

3. The method of claim 1, further comprising:
receiving said value of the noise variance ($\sigma^2$) from said base station.

4. A method of pre-distorting a signal ($S_i(t)$) to be transmitted over an uplink transmission channel to a base station by a mobile terminal (i), each symbol ($d_i$) transmitted by said mobile terminal being spread with a coding sequence ($c_i(l)$) over a plurality of carriers (l) to produce a plurality of corresponding frequency components ($d_ici(l)$) of said signal ($S_i(t)$), comprising:

weighting each frequency component ($d_ic_i(l)$) by a weighting coefficient ($\omega_i(l)$) corresponding to a channel response coefficient ($h_i(l)$) of a corresponding downlink transmission channel at a corresponding frequency ($f_l$) and to a value of a noise variance ($\sigma^2$) affecting said plurality of carriers, an amplitude $\omega'_i(l)$ of the weighting coefficient being $$\omega'_i(l) = \alpha' \frac{\rho_i(l)}{\beta \frac{K-1}{N} |\rho_i(l)|^2 + \sigma^2}$$

where $\rho_i(l)$ is an amplitude of the channel response coefficient, K is a number of active mobile terminals served by said base station, N is a length of said coding sequence, $\alpha$ is a normalisation coefficients, and $\beta$ is a real weighting coefficient.

5. The method of claim 4, further comprising:
retrieving said value of noise variance ($\sigma^2$) from a look-up table.

6. The method of claim 4, further comprising:
receiving said value of the noise variance ($\sigma^2$) from said base station.

7. A mobile terminal (i) configured to pre-distort a signal ($S_i(t)$) prior to transmitting said signal over an uplink transmission channel to a base station, including a spreader configured to spread each symbol ($d_i$) with a coding sequence ($c_i(l)$) over a plurality of carriers (l) to produce a plurality of corresponding frequency components ($d_ici(f)$) of said signal ($S_i(t)$), comprising:

a pre-distorter configured to apply a weighting coefficient ($\omega_i(l)$) to each frequency component ($d_ic_i(l)$), the weighting coefficient ($\omega_i(l)$) corresponding to a channel response coefficient ($h_i(l)$) of a corresponding downlink transmission channel at a corresponding frequency ($f_l$) and to a value of a noise variance ($\sigma^2$) affecting said plurality of carriers, the weighting coefficient $\omega hd i(l)$ being $$\omega_i(l) = \alpha' \frac{h_i^*(l)}{\beta \frac{K-1}{N} |h_i(l)|^2 + \sigma^2}$$

where, K is a number of active mobile terminals served by said base station, N is a length of said coding sequence, $\alpha'$ is a normalisation coefficient, $\beta$ is a real weighting coefficient and * denotes a conjugate operation.

8. A mobile terminal (i) configured to pre-distort a signal ($S_i(t)$) prior to transmitting said signal over an uplink transmission channel to a base station, including a spreader configured to spread each symbol ($d_i$) with a coding sequence ($c_i(l)$) over a plurality of carriers (l) to produce a plurality of corresponding frequency components ($d_ic_i(l)$) of said signal ($S_i(t)$), comprising:

a pre-distorter configured to apply a weighting coefficient ($\omega_i(l)$) to each frequency component ($d_ic_i(l)$), the weighting coefficient ($\omega_i(l)$) corresponding to a channel response coefficient ($h_i(f)$) of a corresponding downlink transmission channel at a corresponding frequency ($f_l$) and to a value of a noise variance ($\sigma^2$) affecting said plurality of carriers, an amplitude $\omega'_i(l))$ of the weighting coefficient being $$\omega'_i(l) = \alpha' \frac{\rho(l)}{\beta \frac{K-1}{N} |\rho_i(l)|^2 + \sigma^2}$$

where $\rho_i(l))$ is the amplitude of the channel response coefficient, K is a number of active mobile terminals served by said base station, N is a length of said coding sequence, $\alpha'$ is a normalisation coefficient, and $\beta$ is a real weighting coefficient.

* * * * *